United States Patent [19]

Kajiura et al.

[11] Patent Number: 4,750,011

[45] Date of Patent: Jun. 7, 1988

[54] TELEVISION CAMERA APPARATUS FOR WATCHING OUTDOORS

[75] Inventors: Tetsuro Kajiura; Kunio Nakasato, both of Kanagawa; Katsuya Sakai, Tokyo, all of Japan

[73] Assignee: Sony Corporation, Tokyo, Japan

[21] Appl. No.: 849,308

[22] Filed: Apr. 8, 1986

[30] Foreign Application Priority Data

Apr. 8, 1985 [JP] Japan ................................ 60-15051[U]

[51] Int. Cl.⁴ ......................... G03B 21/22; H04H 7/18
[52] U.S. Cl. ........................................ 354/76; 358/108
[58] Field of Search ................... 358/100, 108; 354/76, 354/81, 293

[56] References Cited

U.S. PATENT DOCUMENTS 4,093,364  6/1978  Miller .............................. 354/293 X
4,346,404  8/1982  Gantenbrink ..................... 358/100 X
4,386,848  6/1983  Clendenin et al. ............... 358/100 X

OTHER PUBLICATIONS

Ritz Camera Center Catalogue, 1961, p. 61, 'Scopes, 354-202.

*Primary Examiner*—Donald A. Griffin
*Attorney, Agent, or Firm*—Hill, Van Santen, Steadman & Simpson

[57] ABSTRACT

There is disclosed herein an attachment device for a camera unit adapted for viewing or shooting a scene from one side of a camera attachment plate, that is on the other side of the plate. The camera attachment unit includes the camera attachment plate provided with a through-hole, a camera lens body tube introduced into said through-hole, a positioning member provided to the forward or foremost part of the camera lens body tube, and a camera part to which the body tube is affixed. The camera part has a pair of pivot arms pivotally mounted on its surface facing the attachment plate. One of the pivot arms is pivotally mounted at its bottom or back end to the camera part, while the other pivot arm is slidably mounted at its bottom or back end along a guide groove on the surface of the camera part facing the camera attachment plate. The forward or foremost parts of these pivot arms are provided with cushioning members for cushioning against the camera attachment plate. The camera part is provided with an operating member for retracting or extending the pivot arms. The camera lens body tube is inserted into and disposed within the through-hole in the camera attachment plate for clamping the camera attachment plate between the positioning member at the forward or foremost part of the camera lens body tube and the pivot arms.

8 Claims, 5 Drawing Sheets

FIG. 7-A
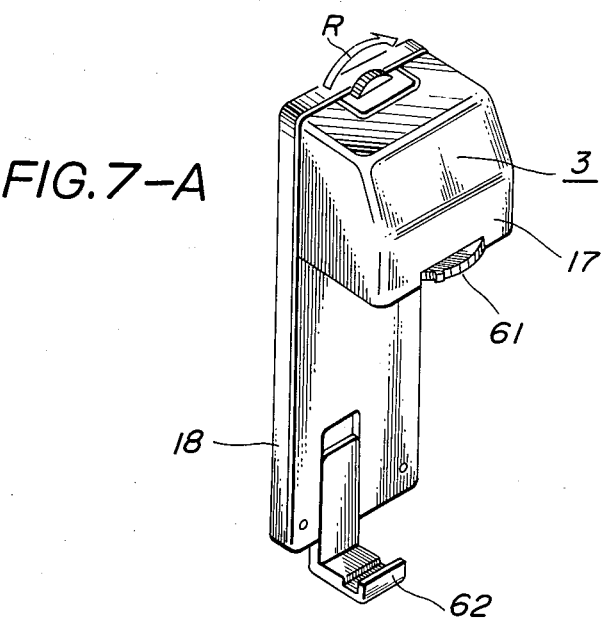
FIG. 7-B
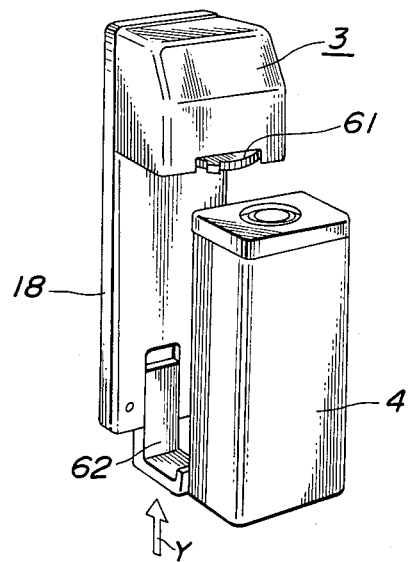

TELEVISION CAMERA APPARATUS FOR WATCHING OUTDOORS

BACKGROUND OF THE INVENTION

This invention relates to a device or unit for mounting or attaching a camera unit to a camera attachment plate such as a door, which camera unit is designed to shoot or view a scene from one side of the door (referred to as the back) that is on the other side of the door (referred to as the front). More particularly, the invention relates to a mounting or attachment unit wherein the camera unit can be attached to any one of a variety of attachment plates of different plate thicknesses as the occasion may demand.

Such camera unit is sometimes referred to as a "doorscope camera" or "doorscope camera unit" in the present specification and may be a television camera for watching the outdoors.

Heretofore, when mounting the camera unit to a door or the like camera attachment plate, a through-hole is formed in the attachment plate, and the camera lens body tube member is inserted into the through-hole, while the camera part is disposed behind or on the one side of the plate.

Since a predetermined minimum length of the camera lens body tube is required as a function of the type of the optical system used, the thickness of the camera attachment plate should be less than the length of the camera lens body tube member. There will occasionally be a gap between the plate and the camera part upon setting the end part of the camera lens body tube in position on the front or on the other side of the plate.

When the thickness of the camera attachment plate is greater than the minimum length of the camera lens body tube member, an extension ring or rings are attached to the camera lens body tube member so that the length of the camera lens body tube member is greater than the thickness of the camera attachment plate. However, since the length of the extension ring itself is of a predetermined length, fine adjustment of the length of the camera lens body tube members to the thickness of the attachment plate is not necessarily feasible. Therefore, a gap may again exist between the attachment plate and the camera part upon setting the end part of the body tube in position on the other side of the plate.

Such a gap may cause the camera part to chatter while causing the body tube member to be injured under the weight of the camera part, since the camera part is held only by the camera lens body tube.

For overcoming such drawback, devices shown in FIGS. 1 and 2 are used for supporting the camera part at one side of the camera attachment plate.

In the device shown in FIG. 1, there is shown a camera part 30 and camera lens body tube member 32 with several plate-like shims 33 disposed within the gap between the camera part 30 and the inner surface of the camera attachment plate 31 so as to fill the gap to hold the camera part 30 without chattering.

In the device shown in FIG. 2, a U-shaped holder 42 is disposed inwardly of the camera attachment plate 41 for holding the camera part 40. Both sides of the holding member 42 are provided with two or more aligned throughholes 43 in which mating or matching projections on the camera part 41 are slidingly guided for adjustably positioning and mounting the camera part 40 in the holding member 42.

The device shown in FIG. 1 is inconvenient in that several plate-like shims 33 are required and, when attaching the camera unit to the attachment plate 31, the body tube should be passed through these shims to be clamped between the camera part 30 and the plate, so that difficulties are involved in the assembling operation.

The device shown in FIG. 2 is bulky and is not effective to reduce the size of the camera unit because the separate holding member 42 must be provided for holding and securing the camera part 40. Moreover, it is difficult to properly adjust the position of the projections 44 within the mating through-holes 43 in the holding member 42 from the inside of the plate 41 so as to hold the camera part 40 parallel to the surface of the plate 41.

In addition, since the force to prop or support an operating portion of the camera against the camera attachment plate is not achieved in the device shown in FIG. 1 or 2, the camera attachment unit is frequently unable to withstand the impact caused when the camera attachment plate is moved, for example, when the plate is a movable member such as a door.

These and other objects of this invention will become apparent from the following disclosure and appended claims.

SUMMARY OF THE INVENTION

It is therefore an object of the present invention to provide a device for mounting or attaching a camera unit to a camera mounting or attachment plate wherein the device may adapt itself to various thicknesses of the camera attachment plate, such as a door, by virtue of a pair of pivot arms provided to the camera part. The pivot arms are propped or supported against the door attachment plate in such a manner that the camera part can be attached to the camera attachment plate without gaps or play so that the camera lens body tube part is not damaged by the weight of the camera part.

It is a further object of the present invention to provide a camera attachment unit which is small in size and compact and which can be easily attached parallel to the camera attachment plate.

The camera attachment of the present invention is adapted for a camera unit adapted for shooting or viewing a scene from behind or on one side of the camera attachment plate, which scene is in front of or on the other side of the plate. The camera attachment unit includes the camera attachment plate provided with a through-hole, a camera lens body tube part to be inserted in the through-hole, a positioning member on the forward part of the camera lens body tube and a camera part to which the lens body tube is affixed. The camera part has a pair of pivot arms pivotally mounted on the surface thereof facing the attachment plate. One of the pivot arms is pivotally mounted at the bottom or back side thereof to the camera part, while the other pivot arm is slidably mounted at the bottom or back side thereof along a guide groove on the surface of the camera attachment plate. The foremost or forward portions of these pivot arms are provided with cushioning members for cushioning against the camera attachment plate. The camera part is provided with an operating member for extending or retracting the pivot arms. The camera lens body tube member is inserted into and disposed within the through-hole in the camera attachment plate for clamping the plate between the positioning member at the foremost or forward part of the camera lens body tube part and the pivot arms. As a result of the above construction, the camera part can be mounted to a camera attachment plate of any arbitrary thickness and any mounting play between the attachment plate and the camera part can be accommodated by the pivot arms propped or supported against the plate so that the camera part can be attached to the attachment plate so as to be able to sustain the impact occasionally applied to the plate. Due to this construction, chattering of the camera part may be eliminated and the camera lens body tube part is not damaged by the weight of the camera part. The camera attachment unit is small-sized and can be easily mounted in a parallel position relative to the camera attachment plate.

BRIEF DESCRIPTION OF THE DRAWINGS

FIGS. 7A and 7B are perspective views showing the attachment of the camera part, wherein FIG. 7A shows the camera part detached and FIG. 7B shows the camera part mounted in position.

DESCRIPTION OF THE PREFERRED EMBODIMENT

Referring to the accompanying drawings, a preferred embodiment of the present invention will be described in more detail.

Figure 1:
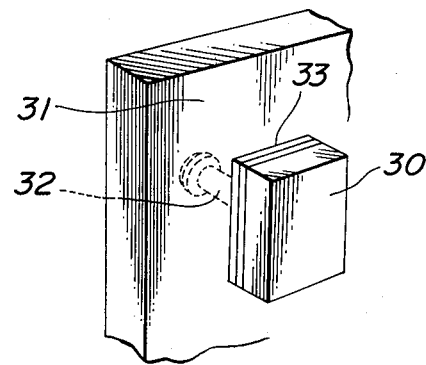
FIG. 1 is a perspective view of a prior art camera attachment device.
Figure 2:
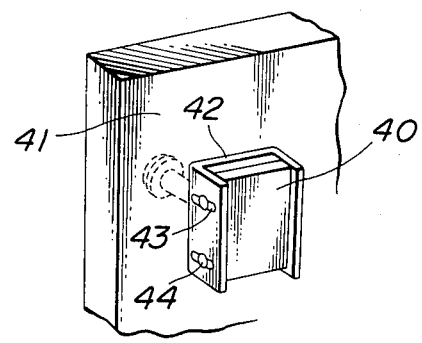
FIG. 2 is a perspective view of another prior art camera attachment device.
Figure 3:
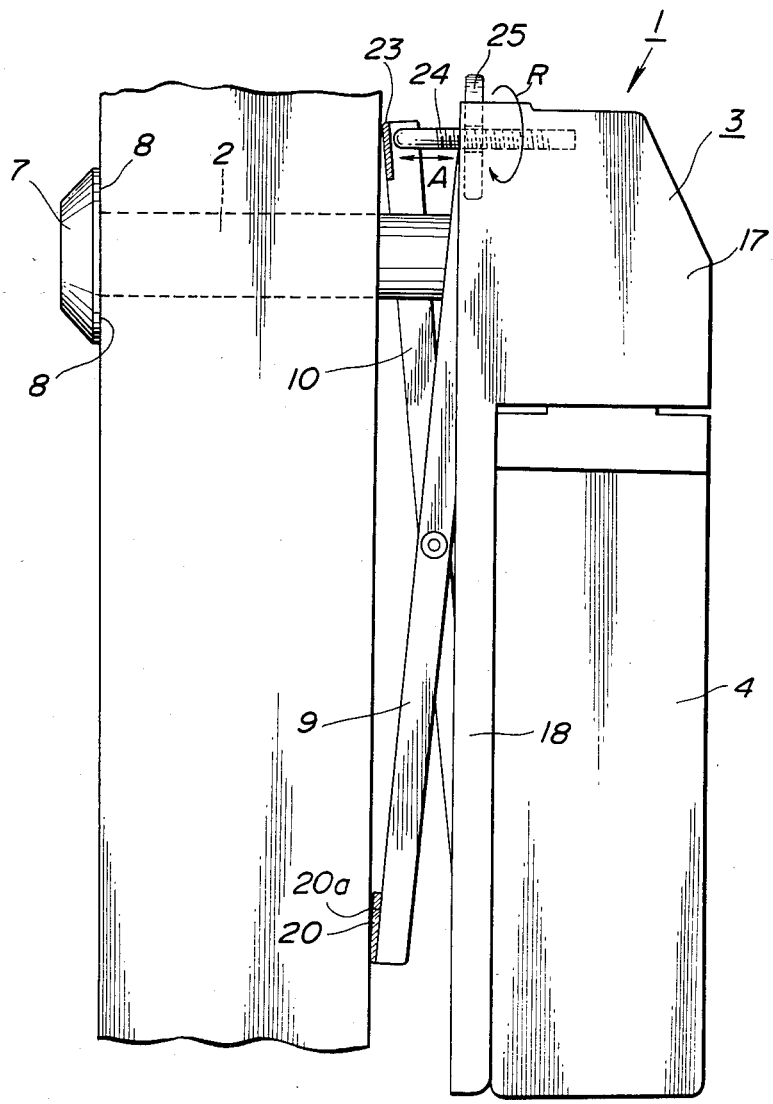
FIG. 3 is a side elevation showing a preferred embodiment of the present invention.
Figure 4:
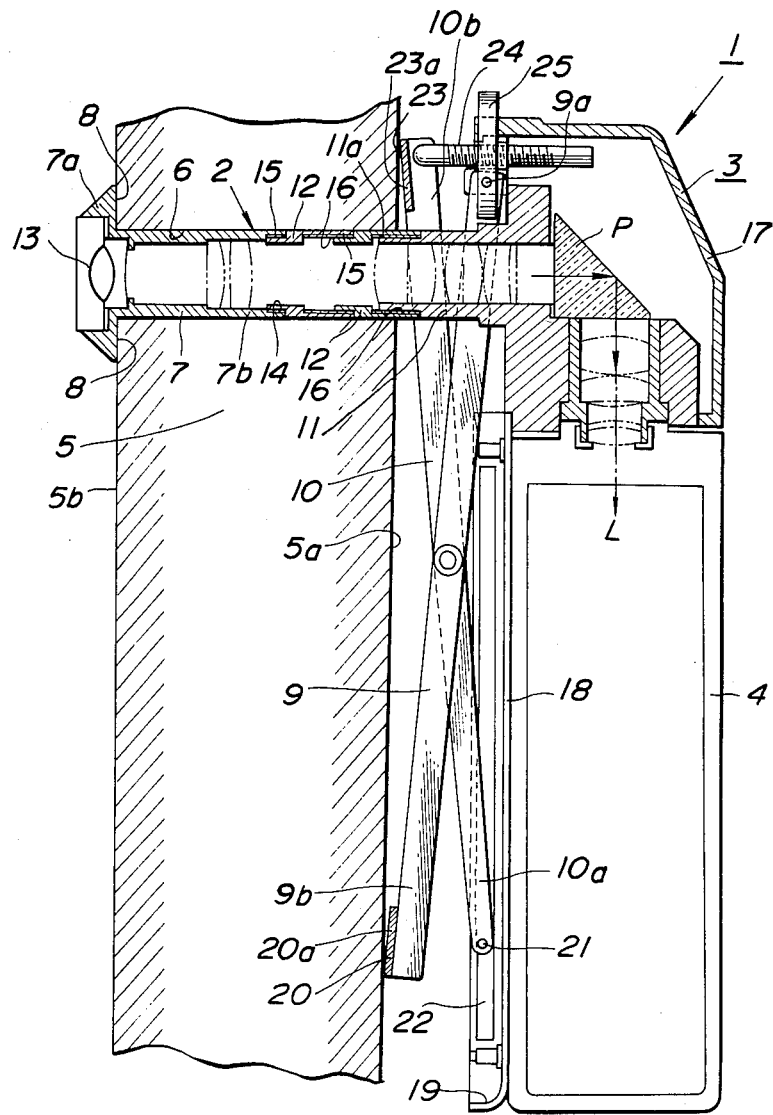
FIG. 4 is a cross-sectional side view of the preferred embodiment of FIG. 1.

Referring to FIGS. 3 and 4, a camera unit 1 includes a camera lens body tube part 2, a camera mounting or attachment 3 and a camera part 4, mounted in position with the body tube 2 introduced into a mating through-hole 6 in a camera attachment plate 5, such as a door, and with the plate 5 clamped between a positioning member 7 fitted to the foremost or forward part of the lens body tube as later described and a pair of pivot arms 9, 10 operatively connected to the mounting member 3.

Figure 5:
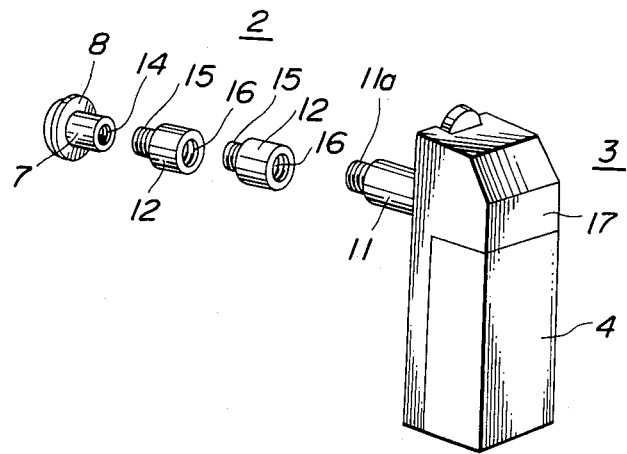
FIG. 5 is a perspective view showing the mounting state of the camera lens body tube part shown in FIGS. 3 and 4.

As shown in FIGS. 3 to 5, the camera lens body tube part 2 is comprised of the positioning member 7 fitted to the end of tube part 2 and a bottom section 11 secured to the camera mounting part 3.

When the thickness of the camera mounting plate 5 is longer than the length of the body tube 2, a suitable number of extension rings 12 may be provided between the positioning member 7 fitted to the end part of the camera lens body tube part 2 and the bottom section 11 of the body tube part 2 for providing a length of the body tube part longer than the thickness of the camera mounting plate 5.

The positioning member 7 is in the form of a cylinder with a lens 13 fitted therein and has a peripheral flange 8 at the foremost or forward part 7a and a female threaded portion 14 at a bottom or back side 7b for meshing with the extension ring 12 or with the bottom section 11 of the camera lens body tube 2.

The botton section 11 of the camera lens body tube part 2 projects from the attachment part 3 in the direction of the attachment plate 5. The foremost or forward part of the bottom section 11 is formed with a male threaded portion 11a for meshing with the extension ring 12 or with the position member 7.

Thus, the length of the camera lens body tube part 2 is shortest when the positioning member 7 meshes with the bottom section 11 of the camera lens body tube part 2. The length of the camera lens body tube part 2 can be extended by attaching, between the positioning member 7 and the bottom section 11 of the camera lens body tube part 2, a number of the extension rings 12, which will naturally vary as a function of the thickness of the mounting plate 5 which is in use.

Figure 6:
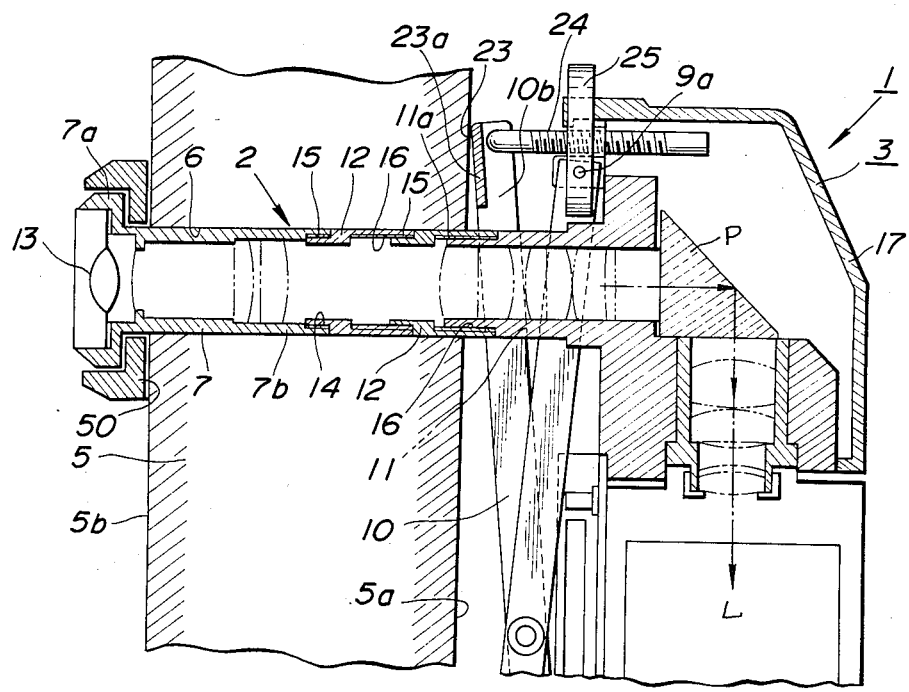
FIG. 6 is an enlarged cross-sectional view showing essential parts of a modified positioning member.

As shown in FIG. 6, an optical image L which has passed through the body tube part 2 is transmitted through the lens system and refracted by a prism P before reaching the camera head 4. According to the doorscope of the present invention, the camera head 4 is mounted approximately at right angles with respect to the body tube part 2 so that the projecting length of the camera head 4 rearwardly of the door or into the interior may be reduced so as to reduce the overall size of the system.

As shown in FIGS. 3 and 4, the camera attachment part 3 includes a housing 17 to which the bottom section 11 of the camera lens body tube part 2 is attached and which interconnects the bottom section 11 of the camera lens body tube part 2 and the camera part 4, a camera base 18 for attachment of the camera part 4, and a pair of pivot arms 9, 10.

These pivot arms 9, 10 are adapted to prop or support the camera unit 1 against the camera mounting plate 5 for fixedly mounting the camera attachment unit on the camera mounting plate 5.

The housing 17 and the camera base 18 are formed integrally with each other and a recess 19 for housing said pivot arms 9, 10 is formed on the surface of the housing and the camera base facing the attachment plate 5.

These pivot arms include a first arm 9 and a second arm 10 pivotally mounted at the center thereof which are received in the recess 19 formed on the surface of the housing 17 and the camera base 18 facing the camera attachment plate.

The first arm 9 is pivotally mounted at the bottom or back side 9a thereof to the upper end part of the housing 17 and provided at the foremost or forward part 9b thereof with a support 20 fitted in turn with a cushioning member 20a. The second arm 10 is provided at the bottom or back side 10a thereof with a guide pin 21 which is slidably guided within a guide groove 22 formed in the inner wall surface of the recess 19. The second arm 10 is also provided at the forward end 10b thereof with a support 23 fitted with a cushioning member 23a.

The forward end 10b of the pivot arm 10 is acted upon by the forward part of an actuating rod 24.

The actuating rod 24 threadably extends through a thumb screw-like operating member 25 rotatably mounted to the housing 17.

The arrangement is so made that, by manually turning the operating member 25 as shown in the direction R in FIG. 3, the operating rod 24 reciprocates in the direction of the arrow mark A for opening or closing the arm 10 and therewith the arm 9 pivotally mounted to the pivot arm 10.

When mounting the camera attachment device to the camera attachment plate 5 such as a door, a through-hole 6 for receiving the camera lens body tube part is formed in the camera attachment plate at a location where the camera unit is to be attached. The opening 6 may be that for installing the fish-eye lens generally used for the conventional doorscope.

Then, depending upon the thickness of the camera attachment plate 5, it is determined whether the extension ring or rings should be used as part of the camera lens body tube part 2 for adjusting the length of the camera lens body tube. The extension ring or rings 12 are then attached to the positioning member when so desired.

In FIG. 4, two extension rings 12 are shown attached to the positioning member 7 and to the bottom section 11 of the body tube part 2.

The bottom section 11 of the body tube part 2 with the extension ring 12 annexed thereto is introduced into the through-opening 6 of the camera attachment plate 5 from the back side 5a thereof, while the positioning member 7 is attached from the other side 5b of the camera attachment plate 5 to the extension ring 12 connected to the bottom section 11 of the body tube. The peripheral flange of the positioning member 7 abuts the other or front side 5b of the camera attachment plate for positioning.

The operating member 25 is then turned manually for opening the arms 9, 10 attached to the surface of the attachment unit 3 facing to the plate 5 for supporting the camera unit 1 against the attachment plate 5. The camera unit 1 is secured in position with the flange 8 of the positioning member 7 and the pair of the pivot arms 9, 10 clamping the camera attachment plate 5 therebetween for securely mounting the camera attachment unit to the camera attachment plate 5.

FIG. 6 shows a modified embodiment of the connecting portion of the positioning member 7 to the attachment plate 5. In the present embodiment, a protective collar 50 is rotatably mounted between the peripheral flange 8 and the attachment plate 5.

It is noted that, since the positioning member 7 is screwed to the bottom section 11 of the attachment unit by the meshing between the male and female threaded portions as described hereinabove, the body tube 2 can be removed without authority by gripping and turning the foremost or forward part 7a from the side of the attachment plate 5 exteriorly of the room with the aid of pliers. The result is that the door camera in its entirety may become useless or the body tube 2 may be stolen. According to the present embodiment, the forward or foremost part 7a of the positioning member is protected from injury while the body tube is rendered burglar-proof since the collar 50 will only rotate when the collar 50 is gripped and rotated with the aid of pliers from exteriorly of the room.

FIGS. 7A and 7B show the arrangement in which the camera part 4 can be mounted to and dismounted from the camera base 18. The camera part 4 is held in position by a rotary lock knob 61 provided to the camera attachment part 3 and a supporter 62 provided to the base 18. The camera part 4 can be mounted in position, as the supporter 62 is raised in the direction of the arrow mark Y and locked by means of the rotary lock knob 61.

Although the invention has been described with respect to preferred embodiments, it is not to be so limited as changes and modifications can be made which are within the full intended scope of the invention as defined by the appended claims.

We claim as our invention:

1. A doorscope camera for attachment to a camera attachment plate having a through-hole including:
    a camera lens body tube part positioned in said through-hole;
    a positioning member provided at the foremost part of the camera lens body tube part;
    a camera part attached to the camera lens body tube part;
    a pair of retractable and extendible pivot arms for engaging the surface of the camera attachment plate facing the camera part; and
    an operating member associated with said camera part for retracting or extending said pivot arms; whereby
    said camera lens body tube member is installed into and held in said through-hole in said camera attachment plate so that the camera attachment plate is clamped between the positioning member at the foremost part of the camera lens body tube part and the pivot arm.

2. A doorscope camera according to claim 1, wherein one of the pivot arms is pivotally mounted at the bottom thereof to the camera part and the other of the pivot arms is pivotally mounted at the bottom part thereof for sliding along a guide groove on the surface of the camera part facing said camera attachment plate.

3. A doorscope camera according to claim 2, wherein means are provided on the foremost part of the pivot arms for cushioning against the camera attachment plate.

4. A doorscope camera according to claim 1, further comprising means for refracting incident light on said camera lens body tube, and a housing for holding said camera part substantially at right angles with said camera lens body tube.

5. A doorscope camera according to claim 1, further comprising a protection ring surrounding the foremost part of said positioning member and disposed between the outside of said camera attachment plate and the flange side of the foremost part.

6. A doorscope camera according to claim 5, wherein said protection ring is mounted for rotation about said positioning member.

7. A doorscope camera comprising:
    a camera attachment plate provided with a through-opening;
    a camera lens body tube part introduced into said through-opening;
    a positioning member provided to the foremost part of the camera lens body tube part;
    a camera part to which the camera lens body tube part is mounted;
    means for refracting the light incident on said camera lens body tube part;
    a housing for holding the head of the camera part substantially at right angles with respect to the camera lens body tube part; and
    means provided on said housing for holding and locking said camera part.

8. A camera attachment unit for attachment to a camera attachment plate provided with a through-hole including:
    a camera lens body tube part introduced into said through-hole;

a positioning member provided to the foremost part of the camera lens body tube;

a camera part to which the camera lens body tube is attached;

a pair of pivot arms pivotally connected to the surface of the camera part facing the camera attachment plate for pivoting between a retracted position and an extended position;

one of said pivot arms being rotatably mounted at the bottom thereof to said camera part and the other pivot arm being slidably mounted in a guide groove on the surface of said camera part facing said camera attachment plate, said pivot arms carrying means for cushioning against said camera mounting plate; and means provided to said camera part for operating said pivot arms in a retracted or extended direction; whereby said camera lens body tube part is introduced into and disposed within said through-hole in said camera attachment plate, and said attachment plate is clamped between said positioning member at the foremost part of the camera lens body tube and said pivot arms.

* * * * *